United States Patent
Makimoto et al.

(10) Patent No.: US 10,144,268 B2
(45) Date of Patent: Dec. 4, 2018

(54) AIR CONDITIONING DEVICE FOR VEHICLE

(71) Applicant: DENSO CORPORATION, Kariya, Aichi-pref. (JP)

(72) Inventors: Naoya Makimoto, Kariya (JP); Masaaki Kawakubo, Kariya (JP); Takayuki Watanabe, Kariya (JP); Masatsugu Yonekura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/574,181

(22) PCT Filed: May 19, 2016

(86) PCT No.: PCT/JP2016/064894
§ 371 (c)(1),
(2) Date: Nov. 15, 2017

(87) PCT Pub. No.: WO2016/186170
PCT Pub. Date: Nov. 24, 2016

(65) Prior Publication Data
US 2018/0126820 A1    May 10, 2018

(30) Foreign Application Priority Data
May 19, 2015   (JP) ................. 2015-102067

(51) Int. Cl.
*B60H 3/00* (2006.01)
*B60H 1/00* (2006.01)

(52) U.S. Cl.
CPC ..... *B60H 1/00564* (2013.01); *B60H 1/00028* (2013.01); *B60H 1/00778* (2013.01);
(Continued)

(58) Field of Classification Search
CPC ............ B60H 1/00564; B60H 1/00028; B60H 1/00778; B60H 1/00835; B60H 1/00842;
(Continued)

(56) References Cited

U.S. PATENT DOCUMENTS 4,437,393 A * 3/1984 Stolz ................. B60H 1/00028
                                                  454/147
4,582,124 A * 4/1986 Yoshimi ............ B60H 1/00007
                                                  165/202

(Continued)

FOREIGN PATENT DOCUMENTS

JP        S56000308 U    1/1981
JP        2004230936 A   8/2004
(Continued)

*Primary Examiner* — Davis Hwu
(74) *Attorney, Agent, or Firm* — Harness, Dickey & Pierce, P.L.C.

(57) ABSTRACT

An air conditioning device for a vehicle includes a door control unit that controls multiple blowing port doors or an air mix door to prevent a heat generated from a heater core from leaking out of an air conditioning case before air conditioning of a vehicle interior is determined to be started. The air conditioning device includes an air conditioning control unit that performs the air conditioning of the vehicle interior by controlling the multiple blowing port doors to open at least one of multiple blowing ports and blow out a heat in the air conditioning case as hot air to the vehicle interior from the at least one blowing port after the air conditioning in the vehicle interior is determined to be started.

17 Claims, 4 Drawing Sheets

(52) U.S. Cl.
CPC ..... *B60H 1/00835* (2013.01); *B60H 1/00842* (2013.01); *B60H 1/00899* (2013.01)

(58) Field of Classification Search
CPC ............ B60H 1/00899; B60H 1/00057; B60H 1/00321
USPC .......................................................... 165/42
See application file for complete search history.

(56) References Cited

U.S. PATENT DOCUMENTS

| | | | | |
|---|---|---|---|---|
| 4,971,245 A | * | 11/1990 | Maisotsenko | B60H 1/00321 126/113 |
| 4,976,309 A | * | 12/1990 | Averin | B60H 1/00057 165/126 |
| 2015/0151609 A1 | | 6/2015 | Satou et al. | |

FOREIGN PATENT DOCUMENTS

| | | | |
|---|---|---|---|
| JP | 2006248386 A | 9/2006 | |
| JP | 2008296717 A | 12/2008 | |
| JP | 2013256230 A | 12/2013 | |

\* cited by examiner

AIR CONDITIONING DEVICE FOR VEHICLE

CROSS REFERENCE TO RELATED APPLICATIONS

This application is a U.S. National Phase Application under 35 U.S.C. 371 of International Application No. PCT/JP2016/064894 filed on May 19, 2016 and published in Japanese as WO 2016/186170 A1 on Nov. 24, 2016. This application is based on and claims the benefit of priority from Japanese Patent Application No. 2015-102067 filed on May 19, 2015. The entire disclosures of all of the above applications are incorporated herein by reference.

TECHNICAL FIELD

The present disclosure relates to an air conditioning device for a vehicle.

BACKGROUND ART

Patent Document 1 discloses an air conditioning device for a vehicle that implements preliminary air conditioning for a driver's seat preferentially while blowing out hot air only from a driver's-seat foot blowing port before an occupant gets on a vehicle. As a result, the driver's seat where a person is supposed to positively exist can be heated preferentially.

PRIOR ART LITERATURE

Patent Literature

Patent Literature 1: JP 2006-248386 A

SUMMARY

In the air conditioning device for a vehicle, since the hot air is blown out only from the driver's-seat foot blowing port before the occupant gets on the vehicle, the driver's seat can be preferentially heated. However, in this case, the hot air diffuses from the driver's seat to an entire vehicle interior before the occupant gets on the vehicle. For that reason, the effect of air-conditioning the driver's seat is weak, and an energy required for air-conditioning the vehicle interior is wastefully consumed.

In view of the above situations, an object of the present disclosure is to provide an air conditioning device for a vehicle that reduces wasteful consumption of an energy required for air conditioning in a vehicle interior.

According to an aspect of the present disclosure, an air conditioning device for a vehicle includes: an air conditioning case that includes a suction port through which an air flow is drawn therein, the air flow drawn through the suction port circulating in the air conditioning case toward a plurality of blowing ports open in a vehicle interior; a plurality of blowing port doors opening and closing the plurality of blowing ports, respectively; a heater core disposed in the air conditioning case to heat the air flow drawn through the suction port; a bypass passage provided in the air conditioning case, through which the air flow drawn through the suction port bypasses the heater core and flows toward the blowing ports; an introduction passage provided in the air conditioning case, through which the air flow drawn through the suction port is introduced into the heater core; an air mixing door provided in the air conditioning case to adjust a ratio between a flow channel cross-sectional area of the bypass passage and a flow channel cross-sectional area of the introduction passage; a door control unit, before air conditioning in the vehicle interior is determined to be started, controlling the plurality of blowing port doors or the air mix door to prevent heat generated from the heater core from leaking out of the air conditioning case; and an air conditioning control unit, after the air conditioning of the vehicle interior is determined to be started, performing the air conditioning of the vehicle interior by controlling the plurality of blowing port doors to open at least one of the plurality of blowing ports and to blow out the heat inside the air conditioning case as hot air to the vehicle interior from the at least one of the plurality of blowing ports.

According to the above configuration, before the air conditioning in the vehicle interior is determined to be started, the heat is accumulated in the air conditioning case, and then after the air conditioning in the vehicle interior is determined to be started, the heat in the air conditioning case is blown as the hot air into the vehicle interior from the blowing ports to perform the air conditioning of the vehicle interior after the occupant gets on the vehicle. Therefore, before the air conditioning in the vehicle interior is determined to be started, the hot air blown into the vehicle interior from the blowing ports is prevented from diffusing into the vehicle interior. For that reason, an energy required for air-conditioning the vehicle interior can be prevented from being wastefully consumed.

According to another aspect of the present disclosure, an air conditioning device for a vehicle includes: an air conditioning case that includes a suction port through which an air flow is drawn therein, the air flow drawn through the suction port circulating in the air conditioning case toward a plurality of blowing ports open in a vehicle interior; a plurality of blowing port doors opening and closing the plurality of blowing ports, respectively; a heater core disposed in the air conditioning case to heat the air flow drawn through the suction port; a door control unit, before air conditioning in the vehicle interior is determined to be started, individually controlling the plurality of blowing port doors to prevent a heat generated from the heater core from leaking out of the air conditioning case; and an air conditioning control unit, after the air conditioning of the vehicle interior is determined to be started, performing the air conditioning of the vehicle interior by controlling the plurality of blowing port doors to open at least one of the plurality of blowing ports to blow out the heat inside the air conditioning case as hot air to the vehicle interior from the at least one of the plurality of blowing ports.

According to the above configuration, before the air conditioning in the vehicle interior is determined to be started, the heat is accumulated in the air conditioning case, and then after the air conditioning in the vehicle interior is determined to be started, the heat in the air conditioning case is blown as the hot air into the vehicle interior from the blowing ports to perform the air conditioning of the vehicle interior after the occupant gets on the vehicle. Therefore, before the air conditioning in the vehicle interior is determined to be started, the hot air blown into the vehicle interior from the blowing ports is prevented from diffusing into the vehicle interior. For that reason, an energy required for air-conditioning the vehicle interior can be prevented from being wastefully consumed.

DESCRIPTION OF EMBODIMENTS

Figure 1:
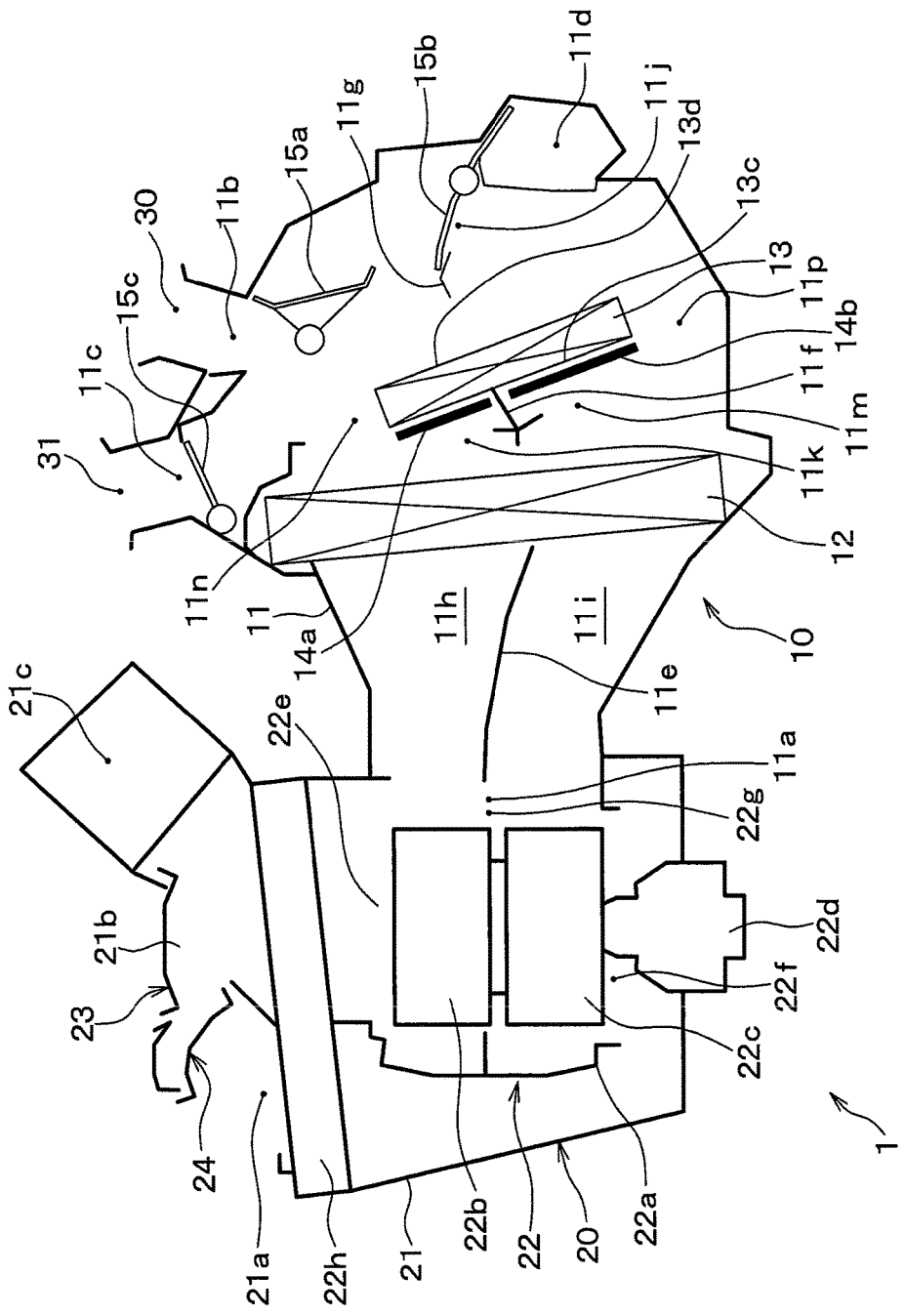
FIG. 1 is a diagram illustrating a cross-sectional configuration of an air conditioning device for a vehicle according to a first embodiment.

Embodiments will be described with reference to the drawings below. In each of the following embodiments, parts which are the same or equivalent to each other are briefly described and are given the same reference numerals.

First Embodiment

A first embodiment will be described with reference to FIGS. 1 to 5. In the present embodiment, an air conditioning device for a vehicle 1 is applied to a vehicle in which the amount of heat is insufficient when an exhaust heat of a traveling engine is used as a heat source for heating. As such a vehicle, there are an electric vehicle not equipped with a traveling engine and a hybrid vehicle that is small in the exhaust heat discharged from the traveling engine.

As shown in FIG. 1, the air conditioning device for a vehicle 1 includes a heater unit 10 and a blower unit 20. The heater unit 10 is disposed in the center of a lower side of an instrument panel in a vehicle width direction on a front side of a vehicle interior in a vehicle traveling direction. The blower unit 20 is disposed with an offset from the heater unit 10 in the vehicle width direction.

The heater unit 10 includes an air conditioning case 11, an evaporator 12, a heater core 13, air mixing doors 14a and 14b, a face door 15a, a foot door 15b, and a defroster door 15c.

The air conditioning case 11 includes an intake port 11a, blowing opening portions 11b, 11c, 11d, and separation walls 11e, 11f, 11g. The intake port 11a suctions an air flow blown out from the blower unit 20.

The blowing opening portion 11b blows an air conditioning wind from an upper air flow channel 11h toward a face blowing port 30 through a duct. The face blowing port 30 blow the air conditioning wind toward an upper body side of an occupant. The blowing opening portion 11c blows the air conditioning wind from the upper air flow channel 11h to a defroster blowing port 31 through the duct. The defroster blowing port 31 blows the air conditioning wind toward a vehicle interior side surface of a front windshield. The blowing opening portion 11d blows the air conditioning wind from a lower air flow channel 11i to a foot blowing port 32 illustrated in FIG. 2 through the duct. The foot blowing port 32 blows the air conditioning wind to a lower body of the occupant.

The separation walls 11e, 11f, and 11 g separate the upper air flow channel 11h and the lower air flow channel 11i of the air conditioning case 11 from each other. The separation wall 11e is disposed between the intake port 11a and the evaporator 12. The separation wall 11f is disposed between the evaporator 12 and the heater core 13. The separation wall 11g is disposed on an air flow downstream side with respect to the heater core 13. An air passage 11j is provided on the air flow downstream side with respect to the separation wall 11f in the air conditioning case 11.

The evaporator 12 is formed in a flat shape including multiple tubes through which a refrigerant flows, a first tank that distributes the refrigerant to the multiple tubes, and a second tank that collects the refrigerant from the multiple tubes.

The evaporator 12 is disposed across the upper air flow channel 11h and the lower air flow channel 11i. The evaporator 12 cools the air flow suctioned through the intake port 11a with the refrigerant whose pressure is reduced by a low-pressure side expansion valve 12e to be described later. As a result, a cold air from the evaporator 12 flows through the upper air flow channel 11h and the lower air flow channel 11i toward the blowing opening portions 11b, 11c, and 11d.

Figure 2:
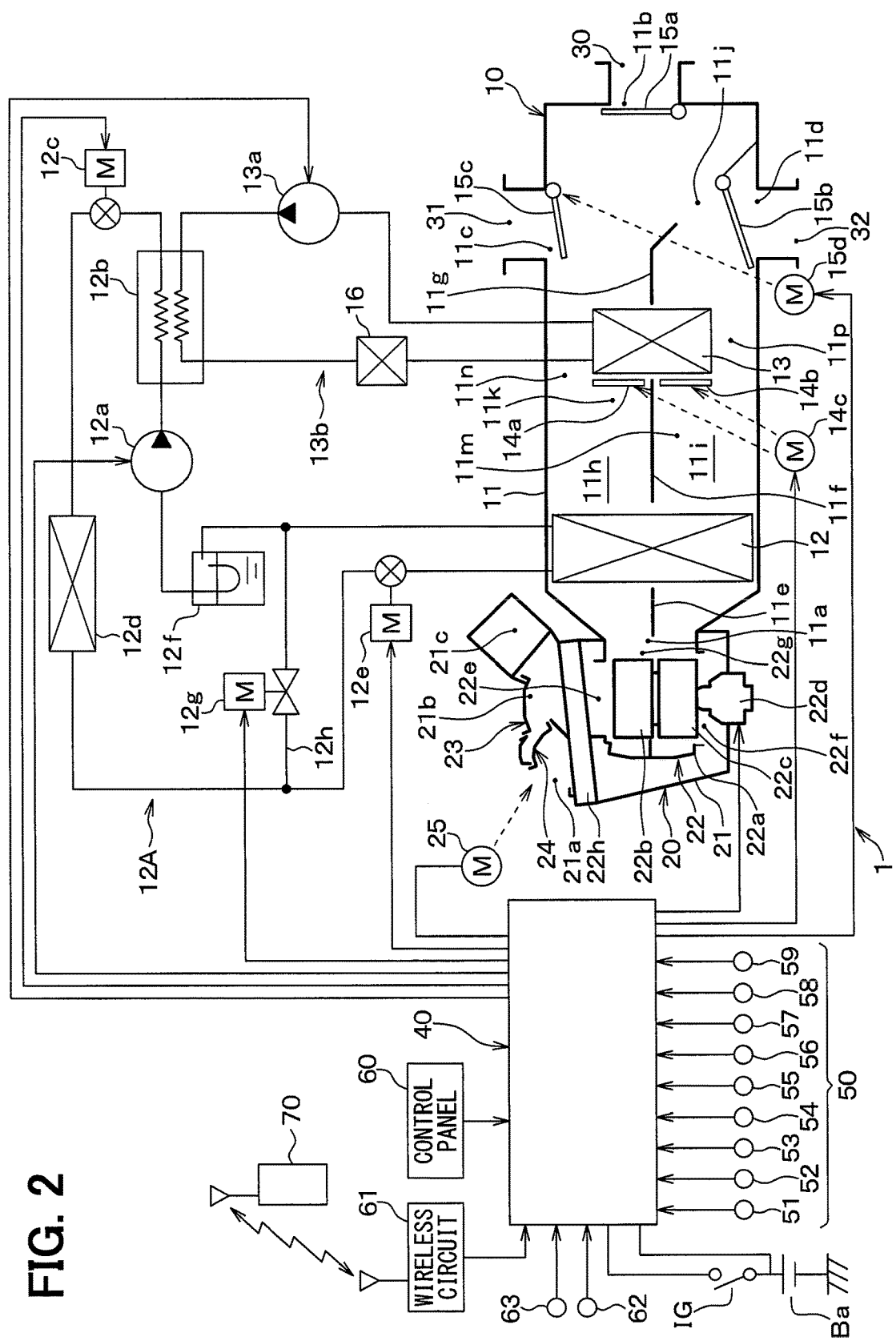
FIG. 2 is a block diagram illustrating a schematic configuration and an electric configuration of an air conditioning device for a vehicle according to the first embodiment.

As illustrated in FIG. 2, the evaporator 12 configures a vapor compression type refrigeration cycle 12A in which the refrigerant is circulated, together with a compressor 12a, a condenser 12b, a high-pressure side expansion valve 12c, an exterior heat exchanger 12d, a low-pressure side expansion valve 12e, an accumulator 12f, and an opening and closing valve 12g. In other words, the evaporator 12 configures a heat pump cycle that moves the heat from the low-pressure side heat exchanger (that is, the evaporator 12 and the exterior heat exchanger 12d) side to the high-pressure side heat exchanger (condenser 12b) side together with the compressor 12a and so on.

The evaporator 12 according to the present embodiment is disposed in an upright state with an air inflow surface facing a vehicle front side and an air outflow surface facing a vehicle rear side.

The compressor 12a includes an electric motor and a compressor mechanism that is driven by the electric motor, suctions and compresses the refrigerant and discharges the high-temperature high-pressure refrigerant. The condenser 12b is a heat exchanger that radiates a heat from the high-temperature high-pressure refrigerant discharged from the compressor 12a to the heat medium. The condenser 12b configures a heat medium circuit 13b together with a heater core 13 and a circulation pump 13a. The circulation pump 13a circulates the heat medium in the heat medium circuit 13b between the heater core 13 and the condenser 12b.

In this example, the heat medium transfers the heat from the condenser 12b to the heater core 13. In the present embodiment, a solution in which an antifreeze is mixed with water is used as the heat medium.

The high-pressure side expansion valve 12c is an electric variable throttle mechanism. The high-pressure side expansion valve 12c includes a valve body configured to change a throttle opening degree, and an electric actuator including a stepping motor that changes the throttle opening degree of the valve body. The throttle opening degree is the opening degree of the refrigerant flow channel between an outlet of the condenser 12b and an inlet of the exterior heat exchanger 12d.

The exterior heat exchanger 12d exchanges heat between the refrigerant that has passed through the high-pressure side expansion valve 12c and the air of the vehicle exterior (hereinafter referred to as outside air).

The low-pressure side expansion valve 12e is an electric variable throttle mechanism. The low-pressure side expansion valve 12e includes a valve body configured to change a throttle opening degree, and an electric actuator including a stepping motor that changes the throttle opening degree of the valve body. The throttle opening degree is the opening degree of the refrigerant flow channel between an outlet of the exterior heat exchanger 12d and an inlet of the evaporator 12.

The accumulator 12f separates the refrigerant flowing through the bypass flow channel 12h from the exterior heat exchanger 12d or the refrigerant flowing from the evaporator 12 into a gas-phase refrigerant and a liquid-phase refrigerant, and leads the gas-phase refrigerant to an inlet of the compressor 12a while compressing the gas-phase refrigerant while storing the liquid-phase refrigerant. The bypass flow channel 12h connects between an outlet of the exterior heat exchanger 12d and an inlet of the accumulator 12f by bypassing the evaporator 12 and the low-pressure side expansion valve 12e. The opening and closing valve 12g is a valve that opens and closes the bypass flow channel 12h.

The heater core 13 is formed in a flat shape including multiple tubes through which the heat medium flows, a first tank that distributes the heat medium to the multiple tubes, and a second tank that collects the heat medium from the multiple tubes. The heater core 13 corresponds to a heating heat exchanger.

The heater core 13 is disposed across the upper air flow channel 11h and the lower air flow channel 11i. The heater core 13 heats the cold air blown from the evaporator 12 with the heat medium in the air conditioning case 11 and blows a hot air.

An upper introduction passage 11k that guides the cold air from the evaporator 12 to the heater core 13 is provided between the evaporator 12 and the heater core 13 in the upper air flow channel 11h. An upper bypass passage 11n that allows the cold air from the evaporator 12 to flow into the blowing opening portions 11b, 11c, and 11d by bypassing the heater core 13 is provided in the upper air flow channel 11h.

A lower introduction passage 11m that guides the cold air from the evaporator 12 to the heater core 13 is provided between the evaporator 12 and the heater core 13 in the lower air flow channel 11i. A lower bypass passage 11p that allows the cold air from the evaporator 12 to flow into the blowing opening portions 11b, 11c, and 11d by bypassing the heater core 13 is provided in the lower air flow channel 11i.

The heater core 13 according to the present embodiment is disposed in an upright state with an air inflow surface 13c facing a vehicle front side and an air outflow surface 13d facing a vehicle rear side. The air inflow surface 13c of the heater core 13 is a portion into which the cold air flows from the introduction passages 11k and 11m. The air outflow surface 13d of the heater core 13 is a portion from which the hot air blows out.

The air mixing door 14a adjusts a ratio of the flow channel cross-sectional area of the upper introduction passage 11k and the flow channel cross-sectional area of the upper bypass passage 11n. In the present embodiment, the air mixing door 14a is configured so as to implement a maximum cool mode in which the upper introduction passage 11k is closed and the upper bypass passage 11n is opened, and a maximum hot mode in which the upper introduction passage 11k is opened and the upper bypass passage 11n is closed.

The flow channel cross-sectional area of the upper introduction passage 11k is a cross-sectional area orthogonal to an air flow direction in the upper introduction passage 11k. The flow channel cross-sectional area of the upper bypass passage 11n is a cross-sectional area orthogonal to the air flow direction in the upper bypass passage 11n.

The air mixing door 14b adjusts a ratio of the flow channel cross-sectional area of the lower introduction passage 11m and the flow channel cross-sectional area of the lower bypass passage 11p. In the present embodiment, the air mixing door 14b is configured so as to implement a maximum cool mode in which the lower introduction passage 11m is closed and the lower bypass passage 11p is opened, and a maximum hot mode in which the lower introduction passage 11m is opened and the lower bypass passage 11p is closed.

The flow channel cross-sectional area of the lower introduction passage 11m is a cross-sectional area orthogonal to an air flow direction in the lower introduction passage 11m. The flow channel cross-sectional area of the lower bypass passage 11p is a cross-sectional area orthogonal to the air flow direction in the lower bypass passage 11p.

The air mixing doors 14a and 14b are driven by a servomotor 14c through a link mechanism.

The air mixing doors 14a and 14b of the present embodiment are formed of, for example, a film type air mixing door that adjusts a ratio of the flow channel cross-sectional area of the introduction passages 11k and 11m, and the flow channel cross-sectional area of the bypass passages 11n and 11p according to a displacement of a film-like door.

The face door 15a opens and closes the blowing opening portion 11b. The foot door 15b opens and closes the blowing opening portion 11d and the air passage 11j. An air passage 11j is provided on an air flow downstream side of the separation wall 11g in the air conditioning case 11. The air passage 11j is an air passage between the upper air flow channel 11h and the lower air flow channel 11i. The defroster door 15c opens and closes the blowing opening portion 11c.

The face door 15a, the foot door 15b and the defroster door 15c according to the present embodiment are driven by the servomotor 15d through the link mechanism to implement various blowing modes. The various blowing modes include a face mode, a foot mode, a bi-level mode, a defroster mode, and the like.

The face mode is a blowing mode in which the blowing opening portion 11b is opened by the face door 15a, the blowing opening portion 11d is closed by the foot door 15b, and the blowing opening portion 11c is closed by the defroster door 15c. The foot mode is a blowing mode in which the blowing opening portion 11b is closed by the face door 15a, the blowing opening portion 11d is opened by the foot door 15b, and the blowing opening portion 11c is closed by the defroster door 15c. The bi-level mode is a blowing mode in which the blowing opening portion 11b is opened by the face door 15a, the blowing opening portion 11d is opened by the foot door 15b, and the blowing opening portion 11c is closed by the defroster door 15c. The defroster mode is a blowing mode in which the blowing opening portion 11b is closed by the face door 15a, the blowing opening portion 11d is slightly opened by the foot door 15b, and the blowing opening portion 11c is opened by the defroster door 15c.

As described above, in the present embodiment, the link mechanism is configured such that one of the doors 15a, 15b, and 15c operates in conjunction with the remaining doors. For that reason, the doors 15a, 15b, and 15c cannot simultaneously close the blowing opening portions 11b, 11c, and 11d (in other words, the blowing ports 30, 31, and 32), respectively.

The blower unit 20 includes a blower casing 21, a blower 22, an inside and outside air introduction door 23, and an inside air introduction door 24. The inside and outside air introduction door 23 and the inside air introduction door 24 are driven by the servomotor 25 through the link mechanism. The blower casing 21 has inside air introduction ports 21a and 21b, and an outside air introduction port 21c. The inside air introduction ports 21a and 21b introduce the air in the vehicle interior (hereinafter referred to as inside air). The outside air introduction port 21c introduces the outside air.

The inside and outside air introduction door 23 adjusts a ratio between the amount of inside air introduced into a centrifugal fan 22b through the inside air introduction port 21b and the amount of outside air amount introduced into the centrifugal fan 22b through the outside air introduction port 21c. The inside air introduction door 24 adjusts the amount of inside air introduced into a centrifugal fan 22c through the inside air introduction port 21a.

The blower 22 is accommodated in the blower unit 20. The blower 22 includes a scroll casing 22a, centrifugal fans 22b and 22c, and a blower motor 22d.

The scroll casing 22a accommodates the centrifugal fans 22b and 22c and has centrifugal suction ports 22e and 22f and a blowing port 22g. The scroll casing 22a collects the air flow blown out from the centrifugal fans 22b and 22c and blows out the collected air flow from the blowing port 22g to the intake port 11a. The centrifugal fans 22b and 22c are each rotated by the blower motor 22d.

With the rotation of the centrifugal fan 22b, the centrifugal fan 22b blows the air flow, which has been introduced from the outside air introduction port 21c and the inside air introduction port 21b through the suction port 22e, from the blowing port 22g to the upper air flow channel 11h of the heater unit 10.

With the rotation of the centrifugal fan 22c, the centrifugal fan 22c blows the air flow, which has been introduced from the inside air introduction port 21a through the suction port 22f, from the blowing port 22g to the lower air flow channel 11i of the heater unit 10. The blower motor 22d rotates the centrifugal fans 22b and 22c through a rotation shaft.

Next, an electric configuration of the air conditioning device for a vehicle 1 according to the present embodiment will be described with reference to FIG. 2.

The air conditioning device for a vehicle 1 includes an electronic control device 40, a sensor group 50, and an operation panel 60. The sensor group 50 includes an evaporator temperature sensor 51, an insolation sensor 52, an outside air sensor 53, an inside air sensor 54, a water temperature sensor 55, refrigerant pressure sensors 56 and 57, and refrigerant temperature sensors 58 and 59.

The electronic control device 40 includes a microcomputer, a memory, a counter, and the like, and executes an air conditioning control process. The electronic control device 40 is operated by an electric power supplied from a low-voltage battery Ba. The memory is a non-transitional substantive storage medium.

With the execution of the air conditioning control process, the electronic control device 40 controls the servomotors 14c, 15d, 25, the blower 22, the expansion valves 12c, 12e, the opening and closing valve 12g, the compressor 12a, and the electric heater 16 based on output signals of the sensor group 50, an output signal of the operation panel 60, a received signal received from a mobile terminal 70 through a radio circuit 61, an output signal of a charge amount detection sensor 62, an output signal of a charging device detection device 63, and an output signal of an ignition switch IG.

The electric heater 16 is disposed between the condenser 12b of the heat medium circuit 13b and the heater core 13. The electric heater 16 heats the heat medium circulating between the condenser 12b and the heater core 13 by an electric power. The electric power is a DC power supplied from a low-voltage battery Ba or a high-voltage battery. The output voltage of the high-voltage battery is set to be higher than the output voltage of the low-voltage battery Ba.

The ignition switch IG is a power switch of a traveling engine or a traveling motor.

The radio circuit 61 communicates with the mobile terminal 70 through radio waves. The mobile terminal 70 outputs a start signal in order to start the preliminary operation according to the operation of the user. The evaporator temperature sensor 51 detects an air temperature of the air blown out of the evaporator 12. The insolation sensor 52 detects an amount of insolation in the vehicle interior. The outside air sensor 53 detects an air temperature (hereinafter referred to as "outside air temperature") of air in the vehicle exterior. The inside air sensor 54 detects an air temperature in the vehicle interior.

The water temperature sensor 55 detects the temperature of the heat medium circulating between the heater core 13 and the condenser 12b. The refrigerant pressure sensor 56 detects a refrigerant pressure between an outlet of the condenser 12b and an inlet of the high-pressure side expansion valve 12c. The refrigerant pressure sensor 57 detects a refrigerant pressure between an outlet of the exterior heat exchanger 12d and an inlet of the low-pressure side expansion valve 12e.

The refrigerant temperature sensor 58 detects a refrigerant temperature between the outlet of the condenser 12b and the inlet of the high-pressure side expansion valve 12c. The refrigerant temperature sensor 59 detects a refrigerant temperature between the outlet of the exterior heat exchanger 12d and the inlet of the low-pressure side expansion valve 12e.

The charge amount detection sensor 62 detects the electric power charged in the high-voltage battery that supplies the electric power to the traveling motor and the electric motor of the compressor 12a. The charging device detection device 63 detects whether a charging device for charging the high-voltage battery is connected to the high-voltage battery, or not. The charging device is installed, for example, on a charging station outside the vehicle. The operation panel 60 is disposed in the vehicle interior and includes a temperature setter for setting a set temperature Tset of the air temperature in the vehicle interior and an air conditioning switch for starting the air conditioning operation. The ignition switch IG is a power switch of a traveling motor or a traveling engine.

Figure 3:
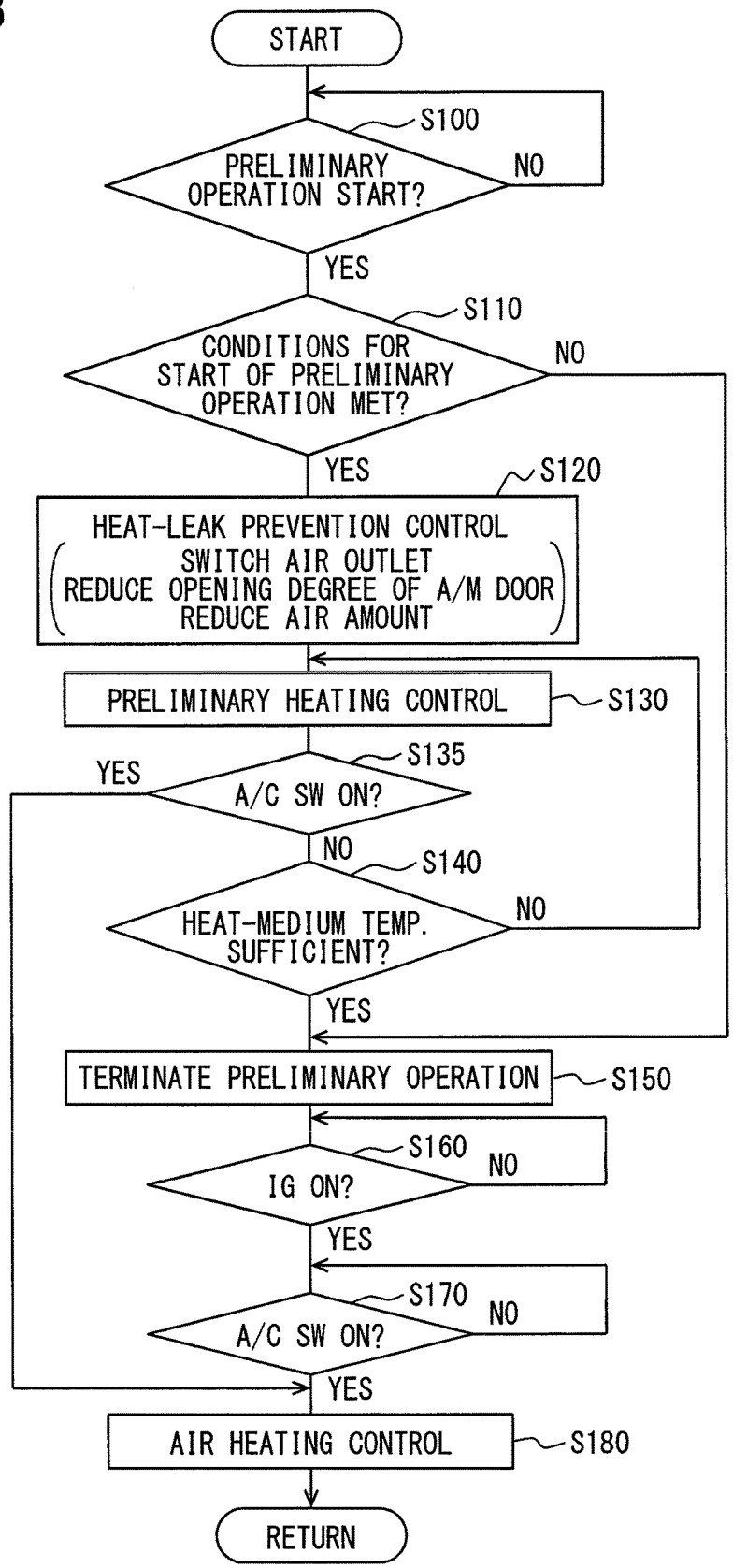
FIG. 3 is a flowchart illustrating an air conditioning control process of an electronic control device in FIG. 2.

Next, the operation of the present embodiment will be described with reference to FIG. 3. FIG. 3 is a flowchart illustrating an air conditioning control process.

The electronic control device 40 executes the air conditioning control process according to a flowchart of FIG. 3.

First, in Step S100, it is determined whether a preliminary operation is to be started by the following determinations (1) and (2). The preliminary operation is an operation for heating the heat medium before starting air conditioning in the vehicle interior. (1) It is determined whether a preliminary operation start time preset by a timer function has been reached, or not. (2) It is determined whether a start signal has been received from the mobile terminal 70 through the radio circuit 61, or not.

In the preliminary operation, as will be described later, heat is stored in the heat medium by heating until the temperature of the heat medium reaches or exceeds a threshold. During the preliminary operation, the heat leakage prevention control as described in (6), (7) and (8) to be described later is performed. The heat leakage prevention control described above is also carried out before completion of the preliminary operation and before it is determined that air conditioning is to be started by the determination of Steps S160 and S170.

When at least one of the following two cases (X) and (Y) is satisfied, the electronic control device 40 determines that the preliminary operation is to be started, and determines YES in Step S100.

(X) A case in which the preliminary operation start time set by the timer function in advance has been reached.
(Y) A case in which a start signal has been received from the mobile terminal 70 through the radio circuit 61.

In a next Step S110, it is determined whether the preliminary operation start condition is satisfied, or not, by the following determinations (3), (4), and (5).

(3) It is determined based on the detected temperature detected by the outside air sensor 53 whether the outside air temperature is lower than a threshold, or not. (4) It is determined based on the detection voltage of the charge amount detection sensor 62 whether the power charged in the high-voltage battery is equal to or more than the threshold, or not. The threshold is an electric power by which the electric motor of the compressor 12a can be sufficiently operated. In other words, it is determined whether the high-voltage battery is charged with the electric power capable of sufficiently operating the compressor 12a, or not. (5) It is determined based on the detection value of the charging device detection device 63 whether the high-voltage battery is connected to the charging device, or not.

First, in a case where the outside air temperature is lower than the threshold, when the electric power charged in the high-voltage battery is equal to or higher than the threshold, it is determined that the preliminary operation start condition is satisfied, and YES is determined in Step S110.

Alternatively, in the case where the outside air temperature is lower than the threshold, when the high-voltage battery is connected to the charging device even if the electric power charged in the high-voltage battery is less than the threshold, it is determined that the preliminary operation start condition is satisfied, and YES is determined in Step S110.

As described above, if YES is determined in Step S110, the process proceeds to Step S120. As a result, the preliminary operation starts. In Step S120, as shown in (6), (7), and (8), a control is implemented in which the heat is prevented from leaking out of the air conditioning case 11, and the heat generated from the heater core 13 is accumulated in the air conditioning case 11.

(6) The foot mode is executed by controlling the doors 15a, 15b, and 15c through the servomotor 15d and the link mechanism.

In the foot mode, the blowing opening portion 11c is closed by the defroster door 15c, the blowing opening portion 11b is closed by the face door 15a, and further the blowing opening portion 11d is opened by the foot door 15b.

For that reason, the face blowing port 30 and the defroster blowing port 31, which are open toward the ceiling side in the vehicle interior, among the blowing ports 30, 31, and 32 are closed. The face blowing port 30 and the defroster blowing port 31 are also blowing ports that are opened above the heater core 13.

(7) The maximum cool mode is executed by controlling the air mixing doors 14a and 14b through the servomotor 14c and the link mechanism.

In the maximum cool mode, the upper introduction passage 11k is closed and the upper bypass passage 11n is opened by the air mixing door 14a. In addition to the above configuration, the lower introduction passage 11m is closed and the lower bypass passage 11p is opened by the air mixing door 14b.

Specifically, the flow channel cross-sectional area of the upper introduction passage 11k is set to a minimum area and the flow channel cross-sectional area of the upper bypass passage 11n is set to a maximum area by the air mixing door 14a.

In this example, the minimum area is a minimum value falling within a range that can be adjusted by the air mixing door 14a in the flow channel cross-sectional area of the upper introduction passage 11k. The maximum area is the maximum value falling within the range that can be adjusted by the air mixing door 14a in the flow channel cross-sectional area of the upper bypass passage 11n.

At the same time, the flow channel cross-sectional area of the lower introduction passage 11m is set to a minimum area by the air mixing door 14b, and the flow channel cross-sectional area of the lower bypass passage 11p is set to a maximum area.

In this example, the minimum area is a minimum value falling within a range that can be adjusted by the air mixing door 14b in the flow channel cross-sectional area of the lower introduction passage 11m. The maximum area is the maximum value falling within the range that can be adjusted by the air mixing door 14b in the flow channel cross-sectional area of the lower bypass passage 11p.

The air mixing doors 14a and 14b are controlled in that manner, as a result of which the air mixing doors 14a and 14b can cover the air flow upstream side (that is, the air inflow surface 13c) of the heater core 13. As a result, the heat from the heater core 13 is prevented from transferring inside the air conditioning case 11 by convection.

(8) The blower motor 22d stops, and the centrifugal fans 22b and 22c stop. As a result, the blowing of the blower 22 is stopped. In other words, the circulation of the air flow in the air conditioning case 11 is stopped In this manner, before it is determined that the air conditioning in the vehicle interior is to be started, the heat from the heater core 13 can be prevented from transferring inside the air conditioning case 11 by convection while the heat can be prevented from leaking from the air conditioning case 11. It should be noted that "when it is determined that air conditioning in the vehicle interior is to be started" is a time when it is determined as YES in Step S160, and it is determined as YES in Step S170 in the present embodiment. Therefore, "before it is determined that air conditioning in the vehicle interior is to be started" means before that time.

Next, in Step S130, the preliminary heating control is started. Specifically, when the detected temperature of the outside air sensor 53 is equal to or higher than a predetermined temperature (for example, zero degree), a dehumidification heating mode is executed. When the detected temperature of the outside air sensor 53 is lower than the predetermined temperature, the heating mode is executed. For that reason, the high-pressure refrigerant discharged from the compressor 12a circulates through the refrigeration cycle 12A. It is to be noted that the predetermined temperature is set to be lower than the threshold used in the above determination of (3).

During execution of one of the dehumidification heating mode and the heating mode, the operation of the circulation pump 13a is started, and the heat medium is circulated in the heat medium circuit 13b between the heater core 13 and the condenser 12b. At that time, in the condenser 12b, the heat medium is heated by the high-pressure refrigerant discharged from the compressor 12a. For that reason, the heat medium heated by the high-pressure refrigerant circulates in the heat medium circuit 13b. Details of the dehumidification heating mode and the heating mode will be described later.

In addition to the above configuration, the electric heater 16 is controlled to heat the heat medium by the electric heater 16. In that manner, the heat medium is heated by the condenser 12b and the electric heater 16.

Next, in Step S135, it is determined based on an output signal of the operation panel 60 whether the air conditioning switch is turned on, or not.

At this time, if the air conditioning switch is turned off, NO is determined in Step S135, and the process proceeds to the next Step S140. Next, in Step S140, it is determined based on the detection value of the water temperature sensor 55 whether the temperature of the heat medium is equal to or higher than the threshold, or not. In other words, it is determined whether or not a sufficient amount of heat has been stored in the heating medium in order to heat the vehicle interior.

When the temperature of the heat medium is equal to or higher than the threshold, it is determined that a sufficient amount of heat has been stored in the heat medium. As a result, the determination result of Step S140 becomes YES. On the other hand, when the temperature of the heat medium is lower than the threshold, it is determined that the sufficient amount of heat has not been stored in the heat medium. As a result, the determination result of Step S140 becomes NO.

The threshold is a temperature that is specified one to one with respect to a required blowing temperature TAO. Therefore, the threshold becomes higher as the required blowing temperature TAO becomes higher. The required blowing temperature TAO is a temperature required as an air temperature blown out from the blowing ports 30, 31, and 32 in order to maintain a detection value Tr of the inside air sensor 54 at a set temperature Tset. The required blowing temperature TAO is calculated based on a detection value Ts of the insolation sensor 52, a detected value Tam of the outside air sensor 53, the detected value Tr of the inside air sensor 54, and the set temperature Tset of the temperature setting device.

In this example, when the temperature of the heat medium is lower than the threshold, NO is determined in Step S140, and the process returns to Step S130. For that reason, as long as the temperature of the heat medium is lower than the threshold, the determination of NO in Step S140 and the preliminary heating control in Step S130 are repeated.

Thereafter, when the temperature of the heat medium becomes equal to or higher than the threshold, it is determined as YES in Step S140, and the process proceeds to the next Step S150. In Step S150, the compressor 12a and the circulation pump 13a are stopped, and the preliminary operation is terminated. For that reason, the compressor 12a and the circulation pump 13a are stopped while maintaining the control states of the doors 15a, 15b, 15c, the air mixing doors 14a, 14b and the blower 22 described in the above items (6), (7) and (8).

Before it is determined that the air conditioning in the vehicle interior is to be started in this manner, control is performed to prevent heat from leaking from the air conditioning case 11 while heating the heat medium. When the temperature of the heat medium becomes equal to or higher than the threshold, the compressor 12a and the circulation pump 13a are stopped while continuing the execution of the control to prevent heat from leaking from the air conditioning case 11.

Thereafter, in step S160, it is determined whether the ignition switch IG is turned on, or not.

At this time, when the ignition switch IG is turned off, the determination in Step S160 is NO. For that reason, as long as the ignition switch IG is turned off, the determination of NO in Step S160 is repeated. Thereafter, when the ignition switch IG is turned on by an occupant's operation, the determination of YES is made in Step S160, and the process proceeds to Step S170.

Next, in Step S170, it is determined based on an output signal of the operation panel 60 whether the air conditioning switch is turned on, or not. In other words, it is determined whether to start the air conditioning in the vehicle interior, or not.

At this time, since the air conditioning switch is turned off before the air conditioning is started, NO is determined in Step S170, and the process returns to step S170. For that reason, before the air conditioning is started, since the air conditioning switch is turned off, the determination of NO in Step S170 is repeated.

Thereafter, when the occupant gets on the vehicle and the air conditioning switch is turned on by the operation of the occupant, the determination of YES is made in Step S170, and the process proceeds to Step S180. In other words, the air conditioning switch is turned on, it is determined that the air conditioning in the vehicle interior is to be started.

In the next Step S180, the heating control is started. In the heating control, one of the dehumidification heating mode and the heating mode is selected and implemented based on the detected temperature of the outside air sensor 53 as in Step S130.

Further, the inside and outside air introduction door 23 and the inside air introduction door 24 are controlled through the servomotor 25 and the link mechanism. At that time, one of an inside and outside air introduction mode, an inside air introduction mode, and an outside air introduction mode is selected based on the required blowing temperature TAO to implement the selected inside and outside air introduction mode. It should be noted that a method for selecting the inside and outside air introduction mode based on the required blowing temperature TAO is well known.

The inside and outside air introduction mode is a mode in which the inside air introduction ports 21a, 21b and the outside air introduction port 21c are opened. The inside air introduction mode is a mode in which the inside air introduction ports 21a and 21b are opened and the outside air introduction port 21c is closed. The outside air introduction mode is a mode in which the inside air introduction ports 21a and 21b are closed and the outside air introduction port 21c is opened.

In addition to the above configuration, the blower motor 22d of the blower 22 is controlled to rotate the centrifugal fans 22b and 22c.

With the rotation of the centrifugal fan 22b, the centrifugal fan 22b suctions the inside air introduced through the inside air introduction port 21b and the outside air introduced from the outside air introduction port 21c through the suction port 22e. The centrifugal fan 22b blows an air flow from the blowing port 22g to the upper air flow channel 11h through the intake port 11a.

The blown air flow passes through the evaporator 12 in the upper air flow channel 11h. At this time, when the dehumidification heating mode is being performed, the air flow in the evaporator 12 is cooled by the refrigerant. As a result, the air flow is dehumidified. On the other hand, when the heating mode is being performed, the air flow passes through the evaporator 12 without being cooled by the refrigerant.

A part of the air flow that has passed through the evaporator 12 as described above flows into the heater core 13 through the upper introduction passage 11k. For that reason, the air flow flowing through the heater core 13 is heated by the heat medium in the heater core 13. Therefore, the air flow is blown out from the heater core 13 as a hot air. On the other hand, among the air flow that has passed through the evaporator 12, the remaining air flow other than the air flow flowing through the heater core 13 flows in the upper bypass passage 11n.

Thereafter, the air flow passing through the heater core 13 and the air flow passing through the upper bypass passage 11n are mixed together and blown out from the blowing opening portion 11b or the blowing opening portion 11c as an air conditioning wind. For that reason, the hot air is blown out from the face blowing port 30 or the defroster blowing port 31 into the vehicle interior as a medium for conveying the heat generated from the heater core 13.

On the other hand, the centrifugal fan 22c suctions the inside air introduced from the inside air introduction port 21a through the suction port 22f, and blows out the air flow from the blowing port 22g to the lower air flow channel 11i through the intake port 11a.

The blown air flow passes through the evaporator 12 in the lower air flow channel 11i. At this time, when the dehumidification heating mode is being performed, the air flow in the evaporator 12 is cooled by the refrigerant. As a result, the air flow is dehumidified. On the other hand, when the heating mode is being performed, the air flow passes through the evaporator 12 without being cooled by the refrigerant.

A part of the air flow that has passed through the evaporator 12 as described above flows into the heater core 13 through the lower introduction passage 11m. For that reason, the air flow flowing through the heater core 13 is heated by the heat medium in the heater core 13. Therefore, the air flow is blown out from the heater core 13 as a hot air. On the other hand, among the air flow that has passed through the evaporator 12, the remaining air flow other than the air flow flowing through the heater core 13 flows in the lower bypass passage 11p.

Thereafter, the air flow passing through the heater core 13 and the air flow passing through the lower bypass passage 11p are mixed together and blown out from the blowing opening portion 11d as an air conditioning wind. For that reason, the hot air is blown out from the foot blowing port 32 into the vehicle interior as a medium for conveying the heat generated from the heater core 13.

As described above, the hot air is blown out from the blowing ports 30, 31, and 32 into the vehicle interior as a medium for conveying the heat generated from the heater core 13. For that reason, the vehicle interior is air conditioned after it is determined that air conditioning in the vehicle interior is to be started.

When the preliminary operation start time has not been reached and the start signal has not been received from the mobile terminal 70 through the radio circuit 61, it is determined that the preliminary operation is not be started, and Step S100 is executed again.

If the outside air temperature is higher than the threshold, it is determined that preliminary operation is not to be started irrespective of whether the electric power charged in the high-voltage battery is equal to or higher than the threshold, or not, and it is determined as NO in Step S110. Alternatively, if the outside air temperature is higher than the threshold, it is determined that the preliminary operation is not to be started irrespective of whether the high-voltage battery is connected to the charging device, or not, and the process proceeds to Step S150.

When the air conditioning switch is turned on by the occupant in the above Step S135, it is determined as YES to implement the heating control in Step S180.

Hereinafter, the control of the electronic control device 40 in the dehumidification heating mode and the heating mode according to the present embodiment will be described, separately.

(Dehumidification Heating Mode)

In the dehumidification heating mode, the electronic control device 40 first controls the rotation speed of the electric motor of the compressor 12a, to thereby control the refrigerant discharge capacity of the compressor 12a.

Specifically, referring to a control map stored in advance in a memory of the electronic control device 40, the electronic control device 40 determines the rotational speed of the electric motor of the compressor 12a corresponding to the required blowing temperature TAO. The control map includes multiple candidate values of the required blowing temperature TAO and multiple candidate values of the rotational speed, and the rotational speed is specified to 1:1 with respect to the required blowing temperature TAO.

With the rotation of the electric motor of the compressor 12a at the rotational speed determined as described above, the refrigerant discharge capacity of the compressor 12a is controlled based on the required blowing temperature TAO.

At the same time, the high-pressure side expansion valve 12c is controlled so that a throttle opening degree of the refrigerant flow channel between the outlet of the condenser 12b and the inlet of the exterior heat exchanger 12d is set to an opening degree at which the pressure of the refrigerant is not reduced.

At the same time, the low-pressure side expansion valve 12e is controlled so that a throttle opening degree of the refrigerant flow channel between the outlet of the exterior heat exchanger 12d and the inlet of the evaporator 12 is set to an opening degree at which the pressure of the refrigerant is reduced.

In this example, the throttle opening degree of the low-pressure side expansion valve 12e is set so that a degree of subcooling of the refrigerant between the outlet of the exterior heat exchanger 12d and the inlet of the low-pressure side expansion valve 12e becomes a target degree of subcooling. The degree of subcooling is calculated based on the detection value of the refrigerant pressure sensor 57 and the detected value of the refrigerant temperature sensor 59. Further, the opening and closing valve 12g is closed to close the bypass flow channel 12h.

When the compressor 12a, the high-pressure side expansion valve 12c, the opening and closing valve 12g, and the low-pressure side expansion valve 12e are controlled as described above, the compressor 12a suctions and compresses a gas-phase refrigerant from the accumulator 12f and discharges the high-pressure refrigerant. The discharged high-pressure refrigerant radiates heat to the heat medium in the condenser 12b. The heat-radiated high-pressure refrigerant flows into the exterior heat exchanger 12d through the high-pressure side expansion valve 12c. In the exterior heat exchanger 12d, the heat of the refrigerant is radiated to the outside air. The heat-radiated refrigerant is reduced in pressure and expanded by the low-pressure side expansion valve 12e. The pressure-reduced and expanded refrigerant absorbs the heat from the air flow in the evaporator 12 and evaporates. The refrigerant discharged from the evaporator 12 flows into the accumulator 12f. In the accumulator 12f, the refrigerant is separated into the gas-phase refrigerant and the liquid-phase refrigerant, and the liquid-phase refrigerant is stored. The gas-phase refrigerant in the gas-phase refrigerant and the liquid-phase refrigerant is led from the accumulator 12f to the inlet of the compressor 12a.

(Heating Mode)

In the heating mode, the electronic control device 40 first controls the rotational speed of the electric motor of the compressor 12a in the same manner as that in the dehumidification heating mode.

At the same time, the high-pressure side expansion valve 12c is controlled so that a throttle opening degree of the refrigerant flow channel between the outlet of the condenser 12b and the inlet of the exterior heat exchanger 12d is set to an opening degree at which the pressure of the refrigerant is reduced.

In this example, the throttle opening degree of the high-pressure side expansion valve 12c is set so that the degree of subcooling of the refrigerant between the outlet of the condenser 12b and the inlet of the exterior heat exchanger 12d becomes the target degree of subcooling. The degree of subcooling is calculated based on the detection value of the refrigerant pressure sensor 56 and the detected value of the refrigerant temperature sensor 58. Further, the opening and closing valve 12g is opened to open the bypass flow channel 12h.

At the same time, the low-pressure side expansion valve 12e is controlled to close the refrigerant flow channel between the outlet of the exterior heat exchanger 12d and the inlet of the evaporator 12.

When the compressor 12a, the high-pressure side expansion valve 12c, the opening and closing valve 12g, and the low-pressure side expansion valve 12e are controlled as described above, the high-pressure refrigerant discharged from the compressor 12a radiates heat to the heat medium in the condenser 12b. The heat-radiated high-pressure refrigerant is reduced in pressure and expanded by the high-pressure side expansion valve 12c. The pressure-reduced and expanded refrigerant absorbs heat from the outside air and evaporates in the exterior heat exchanger 12d. The refrigerant discharged from the exterior heat exchanger 12d flows into the accumulator 12f through the opening and closing valve 12g and the bypass flow channel 12h. In the accumulator 12f, the refrigerant is separated into the gas-phase refrigerant and the liquid-phase refrigerant, and the liquid-phase refrigerant is stored. The gas-phase refrigerant in the gas-phase refrigerant and the liquid-phase refrigerant is led from the accumulator 12f to the inlet of the compressor 12a.

According to the present embodiment described above, the air conditioning device for a vehicle 1 includes the air conditioning case 11 having the air flow channels 11h and 11i through which the air flow suctioned through the intake port 11a flows toward the blowing ports 30 to 32 that open into the vehicle interior. The face door 15a, the foot door 15b, and the defroster door 15c open and close the respective blowing ports of the blowing ports 30 to 32. The heater core 13 is disposed in the air conditioning case 11, and heats the air in the air flow channels 11h and 11i with the heat medium. The upper bypass passage 11n provides the upper air flow channel 11h in the air conditioning case 11. The upper bypass passage 11n allows the air flow suctioned through the intake port 11a to flow toward the blowing ports 30 and 31 while bypassing the heater core 13. The lower bypass passage 11p provides the lower air flow channel 11i in the air conditioning case 11. The lower bypass passage 11p allows the air flow suctioned through the intake port 11a to flow toward the foot blowing port 32 while bypassing the heater core 13. The air mixing doors 14a and 14b adjust a ratio of the flow channel cross-sectional area of the introduction passages 11k and 11m for leading the air suctioned through the intake port 11a to the heater core 13 and the flow channel cross-sectional area of the bypass passages 11n and 11p for each air passage.

The electronic control device 40 controls the blower motor 22d to stop the blower 22 before it is determined that the air conditioning in the vehicle interior is to be started.

The electronic control device 40 controls the air mixing doors 14a and 14b through the servomotor 14c and the link mechanism to implement the maximum cool mode before it is determined that air conditioning in the vehicle interior is to be started. In the maximum cool mode, the upper introduction passage 11k is closed and the upper bypass passage 11n is opened by the air mixing door 14a. In addition to the above configuration, the lower introduction passage 11m is closed and the lower bypass passage 11p is opened by the air mixing door 14b. For that reason, the air mixing doors 14a and 14b can cover the upstream side of the heater core 13 in the air flow direction. For that reason, the heat can be prevented from being transferred from the heater core 13 in the air conditioning case 11 by convection.

The electronic control device 40 executes the foot mode before it is determined that the air conditioning in the vehicle interior is to be started. For that reason, the face blowing port 30 and the defroster blowing port 31, which are open toward the ceiling side in the vehicle interior, among the blowing ports 30, 31, and 32 are closed. Therefore, the heat generated from the heater core 13 can be prevented from leaking to the outside of the air conditioning case 11 from the defroster blowing port 31, and the heat can be accumulated in the air conditioning case 11.

In particular, the foot mode closes the face blowing port 30 and the defroster blowing port 31 that open toward the ceiling side in the vehicle interior among the blowing ports 30, 31, and 32. Therefore, a higher effect than that in the face mode can be obtained when preventing the heat from leaking to the outside of the air conditioning case 11.

As described above, during a period from the start of the preliminary operation until the air conditioning in the vehicle interior is determined to be started, the heat from the air conditioning case 11 can be prevented from being leaked while the heat from the heater core 13 can be prevented from transferring. In other words, the heat released from the heater core 13 can be prevented from leaking to the outside of the air conditioning case 11 while the heat can be prevented from being released from the heater core 13 into the air conditioning case 11.

Further, when the air conditioning switch is turned on, it is determined that the air conditioning in the vehicle interior is to be started, and the implementation of the heating control (Step S180) is started. For that reason, when it is determined that air conditioning in the vehicle interior is to be started after the heat has been stored in the air conditioning case 11, the air flow can be blown from the blowing ports 30 to 32 into the vehicle interior. For that reason, the heat as the hot air blown from the blowing port into the vehicle interior can be prevented from diffusing into the vehicle interior before the air conditioning in the vehicle interior is started. Therefore, wasteful consumption of energy required for heating the vehicle interior can be prevented.

In the present embodiment, before the air conditioning in the vehicle interior is started, the circulation pump 13a circulates the heat medium between the heater core 13 and the condenser 12b while the heat medium is heated by the high-pressure refrigerant discharged from the compressor 12a in the condenser 12b. For that reason, the heat can be stored in the heat medium. For that reason, when a person gets on the vehicle, a sufficiently heated air flow can be blown into the vehicle interior from the blowing ports 30 to 32. In addition, when the temperature of the heat medium decreases before the start of the heating control (Step S180), a time for raising the temperature of the heat medium becomes long. For that reason, because the rotational speed of the compressor 12a increases, problems about abnormal noise and vibration occur. On the other hand, in the present embodiment, the heat leakage prevention control (step S120) is implemented, thereby being capable of making it difficult to lower the temperature of the heat medium. For that reason, problems about the abnormal noise and the vibration can be prevented from occurring in the compressor 12a.

In the present embodiment, since the heat medium is heated by the condenser 12b forming the refrigeration cycle 12A, a power consumption can be reduced as compared with the case of using an electric heater.

Next, effects of the present embodiment will be described with reference to FIGS. 4 and 5.

Figure 4:
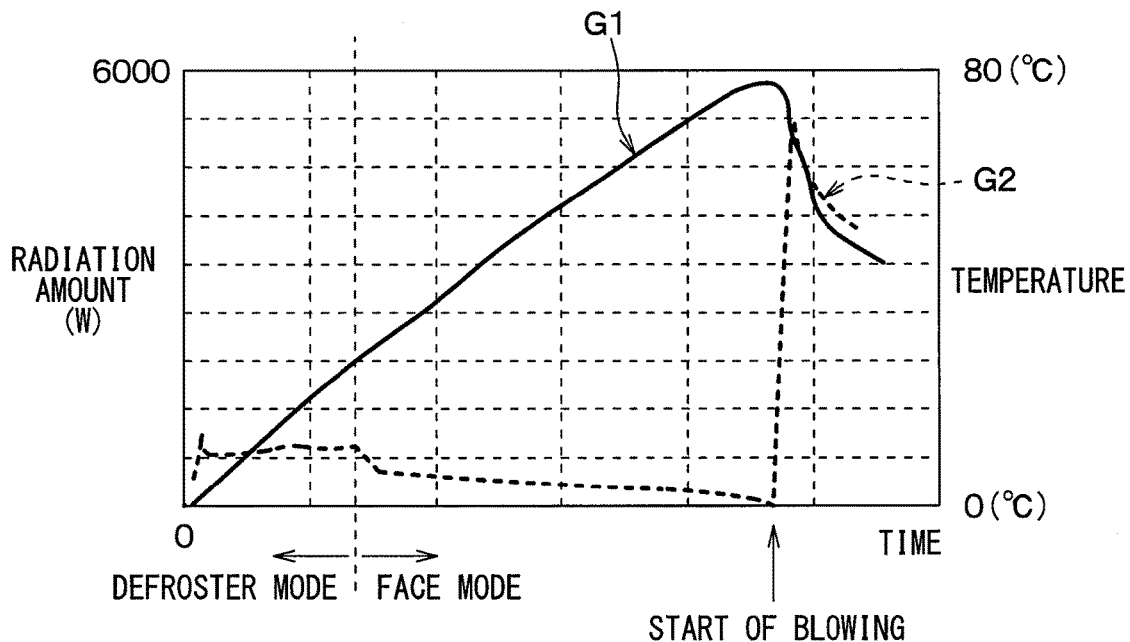
FIG. 4 is a diagram illustrating measurement data of a heat radiation amount of a heater core and measurement data of a temperature of a heat medium according to the first embodiment.

FIG. 4 illustrates a heat radiation amount (W) from the heater core 13 and a temperature of the heat medium when the air outlet mode is switched from the defroster mode to the face mode before the blowing by the blower 22 is started. A vertical axis on a left side in FIG. 4 represents the heat radiation amount, a vertical axis on a right side represents a temperature, and a horizontal axis represents an elapsed time from the start of the preliminary operation. A graph G2 shows measurement data of the heat radiation amount, and a graph G1 is measurement data of the temperature of the heat medium. As can be seen from FIG. 4, in the face mode, an average value of the heat radiation amount radiated from the heater core 13 is reduced by 460 W as compared with the defroster mode.

Figure 5:
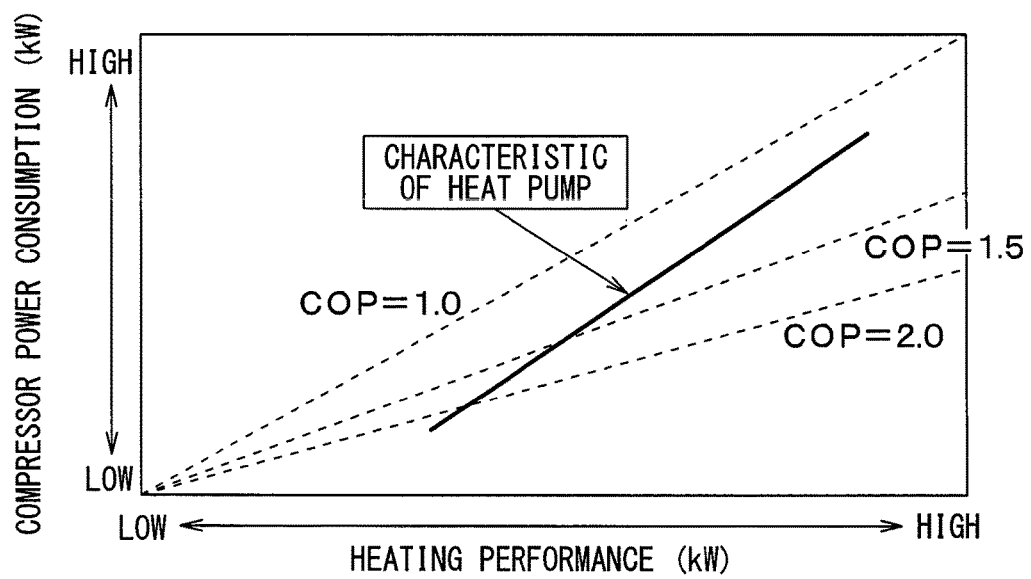
FIG. 5 is a diagram illustrating characteristics of a heat pump according to the first embodiment.

FIG. 5 shows a relationship between the power consumption of the compressor 12a and a COP. The COP is an abbreviation of coefficient of performance and represents the efficiency of the heat pump (refrigeration cycle 12A). Generally, when the heat medium of a high temperature is required, a high heating performance is required in the heat pump. In that case, since the COP decreases as shown in FIG. 5, it is not preferable to operate the heat pump to obtain the heat medium high in the temperature. However, in the preliminary operation of the present embodiment, there is a need to maintain the heat medium at a high temperature state. On the other hand, with the execution of the control to accumulate the heat generated from the heater core 13 in the air conditioning case 11 in Step S120 described above, an operation time in an undesirable region by the heat pump can be reduced. For that reason, a higher effect can be obtained with the use of the control to store the heat in the air conditioning case 11 by the heat pump. In the case of the electric heater, the COP is always 1.0 in any temperature range of the heat medium.

Second Embodiment

In a second embodiment, an example in which the doors 15a, 15b, and 15c can be controlled for opening and closing, independently and the blowing ports 30, 31, and 32 are closed by the doors 15a, 15b, and 15c at the same time, respectively, in the first embodiment will be described.

A link mechanism of the present embodiment is configured so that the doors 15a, 15b, and 15c can be independently opened and closed. For that reason, during the preliminary operation, the face door 15a and the defroster door 15c are independently controlled through the servomotor 15d to close all of the blowing opening portions 11b, 11c, and 11d. Therefore, the respective blowing ports 30, 31, and 32 can be closed at the same time. Therefore, the heat can be further prevented from leaking from the air conditioning case 11 before the air conditioning in the vehicle interior is started.

Other Embodiments

In the first and second embodiments, the example in which the electric heater 16 is activated during the preliminary operation has been described, but instead of the above example, the following operation may be performed during the preliminary operation.

For example, during the preliminary operation, when the electronic control device 40 may stop the electric heater 16 when the detected temperature of the outside air sensor 53 is equal to or higher than the threshold, and may operate the electric heater 16 when the detected temperature of the outside air sensor 53 is lower than the threshold.

In the first and second embodiments, the electronic control device 40 implements the foot mode with the doors 15a, 15b, and 15c in Step S120, and implements the maximum cool mode with the air mixing doors 14a and 14b. Alternatively, the following configurations may be applied.

(a) The foot mode may be carried out while controlling only the doors 15a, 15b, and 15c among the doors 15a, 15b, 15c and the air mixing doors 14a, 14b.

(b) The maximum cool mode may be carried out while controlling only the air mixing doors 14a and 14b among the doors 15a, 15b, and 15c and the air mixing doors 14a and 14b.

In other words, with the use of one of the doors 15a, 15b, and 15c and the air mixing doors 14a and 14b, the heat may be prevented from leaking from the air conditioning case 11 for a period of time from the start of the preliminary operation until the air conditioning in the vehicle interior is determined to be started.

In the first and second embodiments, in order to prevent the heat from transferring from the heater core 13 in the air conditioning case 11 by convection in Step S120, the air mixing doors 14a and 14b cover the air inflow surface 13c of the heater core 13. However, the above configuration may be replaced with the following configuration.

In other words, one of the air mixing doors 14a and 14b covers the air outflow surface 13d of the heater core 13, and prevents the heat from being transferred from the heater core 13 by convection in the air conditioning case 11.

In the first and second embodiments, the example in which the air mixing doors 14a and 14b are disposed on the air flow upstream side of the air flow with respect to the heater core 13 has been described. However, instead of the above configuration, the air mixing doors 14a and 14b may be disposed on the air flow downstream side with respect to the heater core 13.

In that case, in Step S120, the following (c) and (d) may be performed. (c) One of the air mixing doors 14a and 14b covers the air outflow surface 13d of the heater core 13, and prevents the heat from being transferred from the heater core 13 by convection in the air conditioning case 11. (d) The air mixing doors 14a and 14b cover the air outflow surface 13d of the heater core 13, and prevent the heat from being transferred from the heater core 13 by convection in the air conditioning case 11.

Further, the heater core 13 forms the refrigeration cycle, and may be configured by a heating heat exchanger for heating the air flow with the high-pressure refrigerant discharged from the compressor.

In the first and second embodiments, the example in which the flow channel cross-sectional areas of the introduction passages 11k and 11m are set to the minimum areas by the air mixing doors 14a and 14b in Step S120 has been described, but the present invention is not limited to the above example, and may be configured as follows.

In other words, if the air mixing doors 14a and 14b cover a part of the air inflow surface 13c (or the air outflow surface 13d), there is no need to set the flow channel cross-sectional areas of the introduction passages 11k and 11m to the minimum areas.

In the first and second embodiments, the example in which the film type doors are used as the air mixing doors 14a and 14b has been described. However, the present invention is not limited to the above type, but may be configured by various types of doors other than the film type doors (for example, plate doors, rotary doors, etc.).

In the first and second embodiments described above, the electronic control device 40 stops the blowing by the blower 22 for the period of time after the preliminary operation is started in the determination of YES in Steps S100 and S110 until it is determined that the air conditioning in the vehicle interior is to be started. However, during the above period of time, slight blowing may be implemented by the blower 22.

In the first and second embodiments, the example in which the doors 15a, 15b, 15c, the air mixing doors 14a, 14b, and the blower 22 are controlled during the preliminary operation has been described. However, instead of such a configuration, only the blower 22 among the doors 15a, 15b, 15c, the air mixing doors 14a, 14b, and the blower 22 may be controlled to stop the blower 22.

In other words, in the preliminary operation, the blower 22 is stopped in a state where the doors 15a, 15b, 15c and the air mixing doors 14a, 14b are not controlled.

In the first and second embodiments, the electronic control device 40 determines whether to start the air conditioning in the vehicle interior, or not by determining whether the air conditioning switch is turned on, or not. However, the above configuration may be replaced with the following configurations (e), (f), (g), and (h).

(e) In the case where a seating sensor for determining whether the occupant has seated in the seat, or not, is employed, when it is determined that the occupant has seated in the seat by detection of the seating sensor, it is determined that the air conditioning in the vehicle interior is to be started, and the heating control in Step S180 is implemented.

(f) In the case where the door sensor for detecting whether an entrance and exit door has been opened or closed, or not, is employed, if it is determined that the occupant has closed the entrance and exit door after having opened the entrance and exit door by the detection of the door sensor, then it is determined to start air conditioning in the vehicle compartment, and the heating control in Step S180 is implemented.

(g) When it is determined that the occupant has opened the entrance and exit door, it is determined that the air conditioning in the vehicle interior is to be started, and the heating control in Step S180 is implemented.

(h) When it is determined that a door lock of the entrance and exit door has been released, it is determined that the air conditioning in the vehicle interior is to be started, and the heating control in Step S180 is implemented.

As described above, the determination as to whether to start the air conditioning in the vehicle interior is made with the use of any one of turning on the air conditioning switch, detecting the seating of the seating sensor, opening or closing the entrance and exit door, and unlocking of the door lock. The determination includes the determination of determining whether the occupant is going to get on the vehicle, or not, in addition to the determination of whether the occupant has got on the vehicle, or not.

In the first and second embodiments described above, the example in which the heat medium is heated with the use of the condenser 12b configuring the vapor compression type refrigeration cycle 12A has been described. Alternatively, instead of such a configuration, an absorption type heating device, an adsorption type heating device, or a combustion type heating device may be used to heat the heat medium.

In the first and second embodiments, in the foot mode, the blowing opening portion 11b is closed by the face door 15a, the blowing opening portion 11d is opened by the foot door 15b, and the blowing opening portion 11c is closed by the defroster door 15c.

However, in the foot mode, the blowing opening portion 11b may be closed by the face door 15a, the blowing opening portion 11d may be opened by the foot door 15b, and the blowing opening portion 11c may be slightly opened by the defroster door 15c.

In the first and second embodiments, the electric heater 16 and the condenser 12b heat the heat medium. Alternatively, in place of such a configuration, one of the electric heater 16 and the condenser 12b may heat the heating medium.

In the first and second embodiments, in the preliminary heating control in Step S130, when the temperature of the outside air is equal to or higher than the predetermined temperature, the electronic control device 40 implements the dehumidification heating mode, and when the temperature of the outside air is lower than the predetermined temperature, the electronic control device 40 implements the heating mode. However, instead of such a configuration, in the preliminary heating control, the heating mode may be implemented irrespective of the outside air temperature. Alternatively, the dehumidification heating mode may be implemented irrespective of the outside air temperature.

It should be noted that the present disclosure is not limited to the embodiments described above, and can be appropriately modified. In addition, each of the above-described embodiments is related to each other, and can be appropriately combined with each other except for a case where the combination is apparently impossible. In the above-described respective embodiments, elements configuring the embodiments are not necessarily indispensable as a matter of course, except when the elements are particularly specified as indispensable and the elements are considered as obviously indispensable in principle. In the above-described respective embodiments, when numerical values such as the number, figures, quantity, a range of configuration elements in the embodiments are described, the numerical values are not limited to a specific number, except when the elements are particularly specified as indispensable and the numerical values are obviously limited to the specific number in principle. In the above-described respective embodiments, when a shape, a positional relationship, and the like of a configuration element and the like are mentioned, the shape, the positional relationship, and the like are not limited thereto excluding a particularly stated case and a case of being limited to specific shape, positional relationship, and the like based on the principle.

The face door 15a, the foot door 15b, and the defroster door 15c correspond to a blowing port door, and the upper bypass passage 11n and the lower bypass passage 11p correspond to a bypass passage. The upper introduction passage 11k and the lower introduction passage 11m correspond to an introduction passage. The electronic control device 40 executes Step S120 to function as a door control unit. The condenser 12b or the electric heater 16 corresponds to a heat source heat exchanger. The electronic control device 40 functions as a heat source control unit with execution of Step S130, functions as an air conditioning control unit and a blowing control unit with execution of Step S180, and functions as a blowing stop control unit with execution of Step S120.

What is claimed is:

1. An air conditioning device for a vehicle, comprising:
   an air conditioning case that includes an intake port through which an air flow is drawn therein, the air flow drawn through the intake port circulating in the air conditioning case toward a plurality of blowing ports open in a vehicle interior;
   a plurality of blowing port doors opening and closing the plurality of blowing ports, respectively;
   a heater core disposed in the air conditioning case to heat the air flow drawn through the intake port;
   a bypass passage provided in the air conditioning case, through which the air flow drawn through the intake port bypasses the heater core and flows toward the blowing ports;
   an introduction passage provided in the air conditioning case, through which the air flow drawn through the intake port is introduced into the heater core;
   an air mixing door provided in the air conditioning case to adjust a ratio between a flow channel cross-sectional area of the bypass passage and a flow channel cross-sectional area of the introduction passage;
   a door control unit, before air conditioning in the vehicle interior is determined to be started, controlling the plurality of blowing port doors or the air mix door to prevent heat generated from the heater core from leaking out of the air conditioning case; and
   an air conditioning control unit, after the air conditioning of the vehicle interior is determined to be started, performing the air conditioning of the vehicle interior by controlling the plurality of blowing port doors to open at least one of the plurality of blowing ports and to blow out the heat inside the air conditioning case as hot air to the vehicle interior from the at least one of the plurality of blowing ports, wherein
   the door control unit controls the plurality of blowing port doors to close an open blowing port above the heater core, thereby preventing the heat from the heater core from leaking out of the air conditioning case through the blowing port.

2. The air conditioning device for a vehicle, according to claim 1, wherein the door control unit controls the plurality of blowing port doors to close one of the plurality of blowing ports open toward a ceiling in the vehicle interior, thereby preventing the heat from the heater core from leaking out of the air conditioning case through the blowing port.

3. The air conditioning device for a vehicle, according to claim 1, wherein the door control unit controls the plurality of blowing port doors to close the respective blowing ports, thereby preventing the heat from the heater core from leaking out of the air conditioning case.

4. The air conditioning device for a vehicle, according to claim 1, wherein
   the plurality of blowing port doors are configured to be individually opened and closed, and
   the door control unit controls the plurality of blowing port doors to close the respective blowing ports, thereby preventing the heat from the heater core from leaking out of the air conditioning case.

5. The air conditioning device for a vehicle, according to claim 1, further comprising:
   a blower that causes the air flow drawn into the air conditioning case through the intake port to circulate in the air conditioning case; and
   a blowing stop control unit that stops the blower to stop circulation of the air flow in the air conditioning case when the door control unit controls the plurality of blowing port doors or the air mixing door.

6. The air conditioning device for a vehicle according to claim 5, further comprising a blowing control unit that controls the blower to circulate the air flow drawn into the air conditioning case through the intake port to flow toward the blowing ports when the air conditioning control unit controls the plurality of blowing port doors after the air conditioning of the vehicle interior is determined to be started.

7. The air conditioning device for a vehicle, according to claim 1, further comprising:
   a heating heat exchanger as the heater core for heating the air flow with a heat medium;
   a heat source heat exchanger that heats the heat medium;
   a pump that circulates the heat medium between the heat source heat exchanger and the heating heat exchanger; and
   a heat source control unit, before the air conditioning of the vehicle interior is determined to be started, controlling the pump to circulate the heat medium between the heat source heat exchanger and the heating heat exchanger while controlling the heat source heat exchanger to heat the heat medium by the heat source heat exchanger.

8. The air conditioning device for a vehicle, according to claim 7, further comprising a compressor that compresses the refrigerant and discharges a high-temperature high-pressure refrigerant, wherein
   the heat source heat exchanger forms a heat pump cycle together with the compressor, and heats the heat medium by utilizing the high-temperature high-pressure refrigerant discharged from the compressor.

9. The air conditioning device for a vehicle, according to claim 7, wherein the heat source heat exchanger is an electric heater that heats the heat medium by electric power.

10. An air conditioning device for a vehicle, comprising:
    an air conditioning case that includes an intake port through which an air flow is drawn therein, the air flow drawn through the intake port circulating in the air conditioning case toward a plurality of blowing ports open in a vehicle interior;
    a plurality of blowing port doors opening and closing the plurality of blowing ports, respectively;
    a heater core disposed in the air conditioning case to heat the air flow drawn through the intake port;
    a bypass passage provided in the air conditioning case, through which the air flow drawn through the intake port bypasses the heater core and flows toward the blowing ports;
    an introduction passage provided in the air conditioning case, through which the air flow drawn through the intake port is introduced into the heater core;

an air mixing door provided in the air conditioning case to adjust a ratio between a flow channel cross-sectional area of the bypass passage and a flow channel cross-sectional area of the introduction passage;

a door control unit, before air conditioning in the vehicle interior is determined to be started, controlling the plurality of blowing port doors or the air mix door to prevent heat generated from the heater core from leaking out of the air conditioning case; and an air conditioning control unit, after the air conditioning of the vehicle interior is determined to be started, performing the air conditioning of the vehicle interior by controlling the plurality of blowing port doors to open at least one of the plurality of blowing ports and to blow out the heat inside the air conditioning case as hot air to the vehicle interior from the at least one of the plurality of blowing ports, wherein the door control unit controls the plurality of blowing port doors to close one of the plurality of blowing ports open toward a ceiling in the vehicle interior, thereby preventing the heat from the heater core from leaking out of the air conditioning case through the blowing port.

11. The air conditioning device for a vehicle, according to claim 10, wherein the door control unit controls the plurality of blowing port doors to close the respective blowing ports, thereby preventing the heat from the heater core from leaking out of the air conditioning case.

12. The air conditioning device for a vehicle, according to claim 10, wherein the plurality of blowing port doors are configured to be individually opened and closed, and the door control unit controls the plurality of blowing port doors to close the respective blowing ports, thereby preventing the heat from the heater core from leaking out of the air conditioning case.

13. An air conditioning device for a vehicle, comprising:

an air conditioning case that includes an intake port through which an air flow is drawn therein, the air flow drawn through the intake port circulating in the air conditioning case toward a plurality of blowing ports open in a vehicle interior;

a plurality of blowing port doors opening and closing the plurality of blowing ports, respectively;

a heater core disposed in the air conditioning case to heat the air flow drawn through the intake port;

a bypass passage provided in the air conditioning case, through which the air flow drawn through the intake port bypasses the heater core and flows toward the blowing ports;

an introduction passage provided in the air conditioning case, through which the air flow drawn through the intake port is introduced into the heater core;

an air mixing door provided in the air conditioning case to adjust a ratio between a flow channel cross-sectional area of the bypass passage and a flow channel cross-sectional area of the introduction passage;

a door control unit, before air conditioning in the vehicle interior is determined to be started, controlling the plurality of blowing port doors or the air mix door to prevent heat generated from the heater core from leaking out of the air conditioning case; and an air conditioning control unit, after the air conditioning of the vehicle interior is determined to be started, performing the air conditioning of the vehicle interior by controlling the plurality of blowing port doors to open at least one of the plurality of blowing ports and to blow out the heat inside the air conditioning case as hot air to the vehicle interior from the at least one of the plurality of blowing ports, wherein the plurality of blowing port doors are configured to be individually opened and closed, and the door control unit controls the plurality of blowing port doors to close the respective blowing ports, thereby preventing the heat from the heater core from leaking out of the air conditioning case.

14. The air conditioning device for a vehicle, according to claim 13, wherein the door control unit controls the air mixing door to close the introduction passage by the air mixing door and cover the heater core in an air flow direction, thereby preventing the heat from the heater core from transferring inside the air conditioning case by convection and preventing the heat from the heater core from leaking out of the air conditioning case.

15. An air conditioning device for a vehicle, comprising:

an air conditioning case that includes an intake port through which an air flow is drawn therein, the air flow drawn through the intake port circulating in the air conditioning case toward a plurality of blowing ports open in a vehicle interior;

a plurality of blowing port doors opening and closing the plurality of blowing ports, respectively;

a heater core disposed in the air conditioning case to heat the air flow drawn through the intake port;

a door control unit, before air conditioning in the vehicle interior is determined to be started, individually controlling the plurality of blowing port doors to prevent a heat generated from the heater core from leaking out of the air conditioning case; and an air conditioning control unit, after the air conditioning of the vehicle interior is determined to be started, performing the air conditioning of the vehicle interior by controlling the plurality of blowing port doors to open at least one of the plurality of blowing ports to blow out the heat inside the air conditioning case as hot air to the vehicle interior from the at least one of the plurality of blowing ports, wherein the door control unit controls the plurality of blowing port doors to close each of the plurality of blowing ports, thereby preventing the heat from the heater core from leaking from the air conditioning case.

16. The air conditioning device for a vehicle, according to claim 15, further comprising:

a blower that causes the air flow drawn into the air conditioning case through the intake port to flow toward the blowing ports; and a blowing stop control unit that stops the blower to stop circulation of the air flow in the air conditioning case when the door control unit individually controls the plurality of blowing port doors.

17. The air conditioning device for a vehicle, according to claim 16, further comprising a blowing control unit that controls the blower to circulate the air flow drawn into the air conditioning case through the intake port to flow toward the blowing ports when the air conditioning control unit controls the blowing port doors after the air conditioning of the vehicle interior is determined to be started.

* * * * *